United States Patent
Nurminen et al.

(10) Patent No.: US 9,973,755 B2
(45) Date of Patent: *May 15, 2018

(54) METHOD, APPARATUS AND COMPUTER PROGRAM PRODUCT FOR PROVIDING IMPROVED DATA COMPRESSION

(71) Applicant: Conversant Wireless Licensing S.a.r.l., Luxembourg (LU)

(72) Inventors: Jani K Nurminen, Lempaala (FI); Sakari Himanen, Lempaala (FI)

(73) Assignee: Conversant Wireless Licensing S.a.r.l., Luxembourg (LU)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/244,856

(22) Filed: Aug. 23, 2016

(65) Prior Publication Data

US 2017/0085877 A1  Mar. 23, 2017

Related U.S. Application Data

(63) Continuation of application No. 14/529,718, filed on Oct. 31, 2014, now Pat. No. 9,451,265, which is a continuation of application No. 11/867,212, filed on Oct. 4, 2007, now Pat. No. 8,886,612.

(51) Int. Cl.
| | |
|---|---|
| G06F 17/30 | (2006.01) |
| H04N 19/124 | (2014.01) |
| G10L 19/24 | (2013.01) |
| H04N 19/196 | (2014.01) |
| G06T 9/00 | (2006.01) |
| H04N 19/147 | (2014.01) |
| G10L 19/032 | (2013.01) |

(52) U.S. Cl.
CPC ............ *H04N 19/124* (2014.11); *G06T 9/00* (2013.01); *G10L 19/24* (2013.01); *H04N 19/147* (2014.11); *H04N 19/196* (2014.11); *G10L 19/032* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,137,835 A | * | 10/2000 | Yamashita | H04N 19/119 348/403.1 |
| 7,190,284 B1 | * | 3/2007 | Dye | G06F 12/023 341/51 |
| 2003/0152105 A1 | * | 8/2003 | Arimilli | H04J 3/1688 370/468 |
| 2004/0008897 A1 | * | 1/2004 | Easwar | H04N 19/63 382/250 |
| 2005/0060147 A1 | * | 3/2005 | Norimatsu | G06Q 20/10 704/230 |
| 2005/0091051 A1 | * | 4/2005 | Moriya | G10L 19/00 704/229 |

* cited by examiner

*Primary Examiner* — Shyue Jiunn Hwa
(74) *Attorney, Agent, or Firm* — Conversant Wireless Licensing

(57) ABSTRACT

An apparatus for providing improved data compression may include an encoder comprising a quantizer for encoding input data and a side model. The quantizer may be trained with respect to high priority data among the input data and may be configured to partially encode the input data by encoding the high priority data. The side model may be trained jointly with the training of the quantizer and is configured to model low priority data among the input data.

12 Claims, 5 Drawing Sheets

METHOD, APPARATUS AND COMPUTER PROGRAM PRODUCT FOR PROVIDING IMPROVED DATA COMPRESSION

CROSS-REFERENCE TO RELATED APPLICATIONS

This application is a continuation of U.S. patent application Ser. No. 14/529,718, filed on Oct. 31, 2014 which is a continuation of U.S. patent application Ser. No. 11/867,212 filed on Oct. 4, 2007 now U.S. Pat. No. 8,886,612. The above-identified application is herein incorporated by reference in its entirety.

FIELD OF THE INVENTION

Embodiments of the present invention relate generally to data compression technology and, more particularly, relate to a method, apparatus and computer program product for providing compression of data for use in various environments such as, for example, speech coding, video coding, audio coding, image coding, etc.

BACKGROUND OF THE INVENTION

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. One area in which there is a demand to increase ease of information transfer relates to data processing services for data being communicated to/from a mobile terminal. The data processing services may be provided from a network server or other network device, from the mobile terminal such as, for example, a mobile telephone, a mobile television, a mobile gaming system, etc, or even from a combination of the mobile terminal and the network device. The data processing services may include transmission, reception, coding, decoding, storage, or other processing of, for example, image files, speech, video or audio signals, etc.

In current applications, a user of a mobile terminal who wishes to wirelessly communicate data comprising images, speech, audio, video, etc., which has been captured by the mobile terminal may experience delays in transmitting the data to the network device. The delays may result due to the relatively long transmission times required to transmit relatively large quantities of data (e.g., large image files captured by imaging devices on modern mobile terminals). Accordingly, compression techniques have been developed in order to reduce transmission times and storage requirements. However, compression techniques may introduce errors or reduce the quality of the compressed data when the data is decompressed for rendering.

An exemplary field in which compression may introduce problems may be speech coding. In this regard, for example, in low bit rate speech coding, spectral information related to a speech signal may be considered to include two portions. A first portion, including a model of the human vocal tract, may be modeled using linear prediction and is referred to as the spectral envelope. The spectral envelope is typically considered the most important part of the spectral information. A second portion of the spectral information may include remaining parts of the spectral information which include detailed information that, while useful in adding to the speech quality, may not be necessary for clear comprehension of the speech. The second portion may be referred to as the residual spectrum or excitation spectrum. The residual spectrum typically has lower perceptual importance, but if the residual spectrum is neglected, speech quality usually suffers to some extent. Since residual information comprising the residual spectrum includes details that cannot be easily modeled by the spectral envelope, the amount of information to be quantized therein may be high.

Several frequency domain and time domain techniques have been developed for modeling and quantizing the residual spectrum. However, these techniques typically share common weaknesses with respect to providing modeling that may be considered too coarse for achieving high quality, or for requiring a large number of bits for quantizing the model parameters for relatively low bit rates. Moreover, conventional mechanisms have typically modeled and quantized the residual spectrum and the spectral envelope separately.

Other types of data may also include portions of the data to be compressed that are of unequal importance. Thus, given the above described problems, it may be advantageous to provide an improved data compression technique that may overcome at least some of the disadvantages described above to, for example, produce improved compression in low bit rate environments.

BRIEF SUMMARY OF THE INVENTION

A method, apparatus and computer program product are therefore provided that may enable data compression of both high priority data and low priority data with relatively low bit rates. In an exemplary embodiment, a main quantizer may be trained for processing the high priority data and a side model may simultaneously be trained for processing the low priority data. As such, training for processing of both the high and low priority data may be completed in order to account for high and low priority data jointly. As such, processing of data may occur without negatively impacting quantizer performance. Accordingly, data compression efficiency may be achieved while maintaining relatively high speech quality for low bit rate speech coding.

In one exemplary embodiment, a method for providing improved data compression is provided. The method may include partially encoding the input data by encoding the high priority data using a quantizer trained with respect to high priority data, and modeling low priority data among the input data using a side model trained jointly with the training of the quantizer.

In another exemplary embodiment, a computer program product for providing improved data compression is provided. The computer program product includes at least one computer-readable storage medium having computer-readable program code portions stored therein. The computer-readable program code portions include first, second and third executable portions. The first executable portion is for partially encoding the input data by encoding the high priority data using a quantizer trained with respect to high priority data. The second executable portion is for modeling low priority data among the input data using a side model trained jointly with the training of the quantizer.

In another exemplary embodiment, an apparatus for providing improved data compression is provided. The apparatus may include an encoder comprising a quantizer for encoding input data and a side model. The quantizer may be trained with respect to high priority data among the input data and may be configured to partially encode the input data by encoding the high priority data. The side model may be trained jointly with the training of the quantizer and is configured to model low priority data among the input data.

In another exemplary embodiment, an apparatus for decoding compressed data is provided. The apparatus includes a side model and a decoder including a dequantizer. The decoder may be configured to decode compressed data using the dequantizer to recover high priority data from a received signal. The side model may be configured to recover low priority data from the received signal. The side model may be trained jointly with the training of a quantizer used to encode the received signal. The quantizer may be trained with respect to the high priority data.

In yet another exemplary embodiment, a method for decoding compressed data is provided. The method may include decoding compressed data using a dequantizer to recover high priority data from a received signal, and recovering low priority data from the received signal using a side model trained jointly with the training of a quantizer used to encode the received signal. The quantizer may be trained with respect to the high priority data.

Embodiments of the present invention may enable relatively high quality encoding of data in low bit rate environments. Accordingly, bits may be preserved for the primary purpose of encoding higher priority data, rather than devoting bits to encoding of less important data (e.g., lower priority data).

BRIEF DESCRIPTION OF THE SEVERAL
VIEWS OF THE DRAWING(S)

Having thus described the invention in general terms, reference will now be made to the accompanying drawings, which are not necessarily drawn to scale, and wherein:

Figure 1:
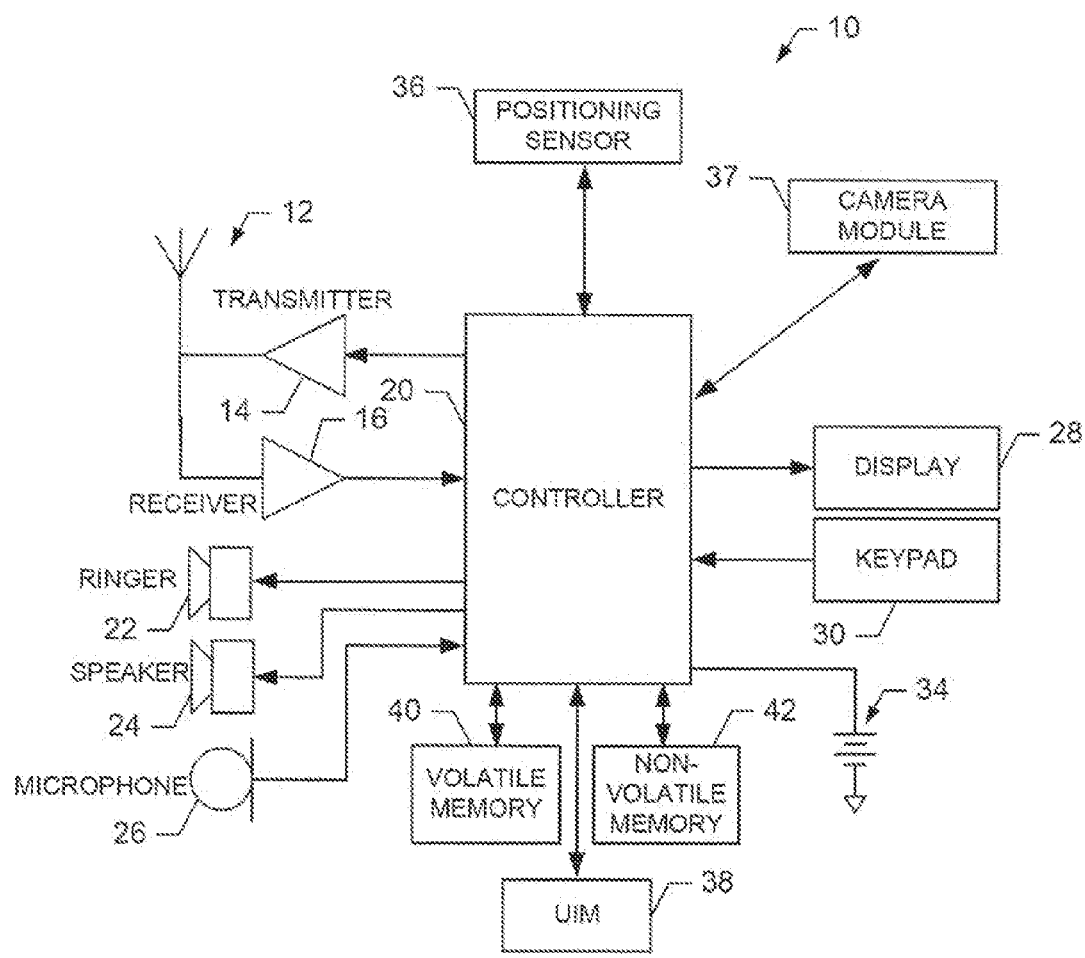
FIG. 1 is a schematic block diagram of a mobile terminal according to an exemplary embodiment of the present invention.

DETAILED DESCRIPTION OF THE
INVENTION

Embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

FIG. 1, one aspect of the invention, illustrates a block diagram of a mobile terminal 10 that would benefit from embodiments of the present invention. It should be understood, however, that a mobile telephone as illustrated and hereinafter described is merely illustrative of one type of mobile terminal that would benefit from embodiments of the present invention and, therefore, should not be taken to limit the scope of embodiments of the present invention. While several embodiments of the mobile terminal 10 are illustrated and will be hereinafter described for purposes of example, other types of mobile terminals, such as portable digital assistants (PDAs), pagers, mobile televisions, gaming devices, laptop computers, cameras, video recorders, audio/video player, radio, GPS devices, or any combination of the aforementioned, and other types of voice and text communications systems, can readily employ embodiments of the present invention.

In addition, while several embodiments of the method of the present invention are performed or used by a mobile terminal 10, the method may be employed by other than a mobile terminal. Moreover, the system and method of embodiments of the present invention will be primarily described in conjunction with mobile communications applications. It should be understood, however, that the system and method of embodiments of the present invention can be utilized in conjunction with a variety of other applications, both in the mobile communications industries and outside of the mobile communications industries.

The mobile terminal 10 includes an antenna 12 (or multiple antennae) in operable communication with a transmitter 14 and a receiver 16. The mobile terminal 10 may further include an apparatus, such as a controller 20 or other processing element, that provides signals to and receives signals from the transmitter 14 and receiver 16, respectively. The signals include signaling information in accordance with the air interface standard of the applicable cellular system, and also user speech, received data and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second, third and/or fourth-generation communication protocols or the like. For example, the mobile terminal 10 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with fourth-generation (4G) wireless communication protocols or the like. As an alternative (or additionally), the mobile terminal 10 may be capable of operating in accordance with non-cellular communication mechanisms. For example, the mobile terminal 10 may be capable of communication in a wireless local area network (WLAN) or other communication networks described below in connection with FIG. 2.

It is understood that the apparatus, such as the controller 20, may include circuitry desirable for implementing audio and logic functions of the mobile terminal 10. For example, the controller 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The controller 20 thus may also include the functionality to convolutionally encode and interleave message and data prior to modulation and transmission. The controller 20 can additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as a conventional earphone or speaker 24, a ringer 22, a microphone 26, a display 28, and a user input interface, all of which are coupled to the controller 20. The user input interface, which allows the mobile terminal 10 to receive data, may include any of a number of devices allowing the mobile terminal 10 to receive data, such as a keypad 30, a touch display (not shown) or other input device. In embodiments including the keypad 30, the keypad 30 may include the conventional numeric (0-9) and related keys (#, *), and other hard and soft keys used for operating the mobile terminal 10. Alternatively, the keypad 30 may include a conventional QWERTY keypad arrangement. The keypad 30 may also include various soft keys with associated functions. In addition, or alternatively, the mobile terminal 10 may include an interface device such as a joystick or other user input interface. The mobile terminal 10 further includes a battery 34, such as a vibrating battery pack, for powering various circuits that are required to operate the mobile terminal 10, as well as optionally providing mechanical vibration as a detectable output. In addition, the mobile terminal 10 may include a positioning sensor 36. The positioning sensor 36 may include, for example, a global positioning system (GPS) sensor, an assisted global positioning system (Assisted-GPS) sensor, etc. However, in one exemplary embodiment, the positioning sensor 36 includes a pedometer or inertial sensor. In this regard, the positioning sensor 36 is capable of determining a location of the mobile terminal 10, such as, for example, longitudinal and latitudinal directions of the mobile terminal 10, or a position relative to a reference point such as a destination or start point. Information from the positioning sensor 36 may then be communicated to a memory of the mobile terminal 10 or to another memory device to be stored as a position history or location information.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which can be embedded and/or may be removable. The non-volatile memory 42 can additionally or alternatively comprise an electrically erasable programmable read only memory (EEPROM), flash memory or the like, such as that available from the SanDisk Corporation of Sunnyvale, Calif., or Lexar Media Inc. of Fremont, Calif. The memories can store any of a number of pieces of information, and data, used by the mobile terminal 10 to implement the functions of the mobile terminal 10. For example, the memories can include an identifier, such as an international mobile equipment identification (IMEI) code, capable of uniquely identifying the mobile terminal 10. Furthermore, the memories may store instructions for determining cell id information. Specifically, the memories may store an application program for execution by the controller 20, which determines an identity of the current cell, i.e., cell id identity or cell id information, with which the mobile terminal 10 is in communication. In conjunction with the positioning sensor 36, the cell id information may be used to more accurately determine a location of the mobile terminal 10.

In an exemplary embodiment, the mobile terminal 10 includes a media capturing module, such as a camera, video and/or audio module, in communication with the controller 20. The media capturing module may be any means for capturing an image, video and/or audio for storage, display or transmission. For example, in an exemplary embodiment in which the media capturing module is a camera module 37, the camera module 37 may include a digital camera capable of forming a digital image file from a captured image, or a video file from a series of captured image frames with or without accompanying audio data. As such, the camera module 37 includes all hardware, such as a lens or other optical device, and software necessary for creating a digital image, video or audio file from captured image/audio data. Alternatively, the camera module 37 may include only the hardware needed to capture an image, while a memory device of the mobile terminal 10 stores instructions for execution by the controller 20 in the form of software necessary to create a digital image file from a captured image. In an exemplary embodiment, the camera module 37 may further include a processing element such as a co-processor which assists the controller 20 in processing image data and an encoder and/or decoder for compressing and/or decompressing image data. The encoder and/or decoder may encode and/or decode according to, for example, a joint photographic experts group (JPEG) standard or other format.

Figure 2:
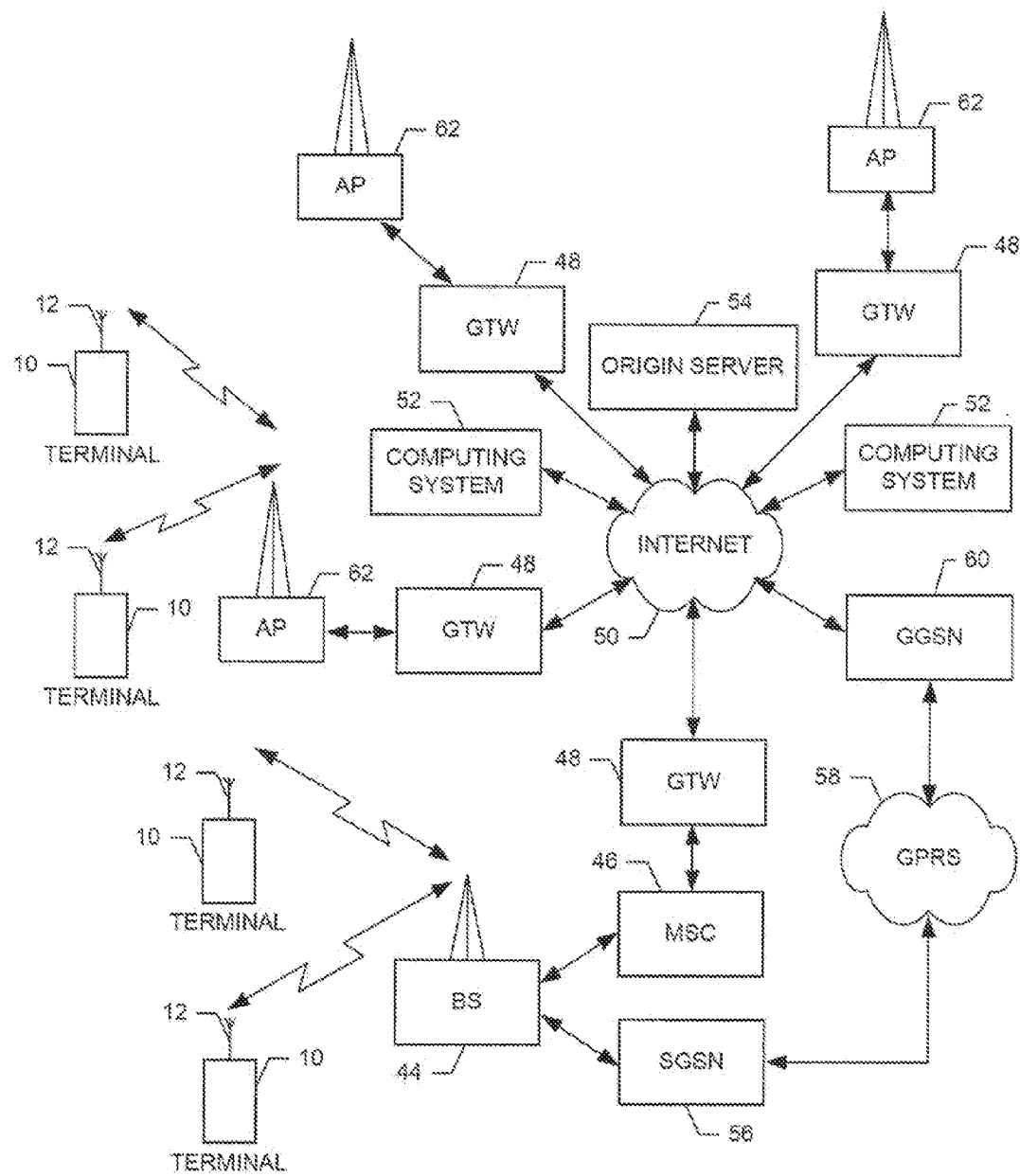
FIG. 2 is a schematic block diagram of a wireless communications system according to an exemplary embodiment of the present invention.

FIG. 2 is a schematic block diagram of a wireless communications system according to an exemplary embodiment of the present invention. Referring now to FIG. 2, an illustration of one type of system that would benefit from embodiments of the present invention is provided. The system includes a plurality of network devices. As shown, one or more mobile terminals 10 may each include an antenna 12 for transmitting signals to and for receiving signals from a base site or base station (BS) 44. The base station 44 may be a part of one or more cellular or mobile networks each of which includes elements required to operate the network, such as a mobile switching center (MSC) 46. As well known to those skilled in the art, the mobile network may also be referred to as a Base Station/MSC/Interworking function (BMI). In operation, the MSC 46 is capable of routing calls to and from the mobile terminal 10 when the mobile terminal 10 is making and receiving calls. The MSC 46 can also provide a connection to landline trunks when the mobile terminal 10 is involved in a call. In addition, the MSC 46 can be capable of controlling the forwarding of messages to and from the mobile terminal 10, and can also control the forwarding of messages for the mobile terminal 10 to and from a messaging center. It should be noted that although the MSC 46 is shown in the system of FIG. 2, the MSC 46 is merely an exemplary network device and embodiments of the present invention are not limited to use in a network employing an MSC.

The MSC 46 can be coupled to a data network, such as a local area network (LAN), a metropolitan area network (MAN), and/or a wide area network (WAN). The MSC 46 can be directly coupled to the data network. In one typical embodiment, however, the MSC 46 is coupled to a gateway device (GTW) 48, and the GTW 48 is coupled to a WAN, such as the Internet 50. In turn, devices such as processing elements (e.g., personal computers, server computers or the like) can be coupled to the mobile terminal 10 via the Internet 50. For example, as explained below, the processing elements can include one or more processing elements associated with a computing system 52 (two shown in FIG. 2), origin server 54 (one shown in FIG. 2) or the like, as described below.

The BS 44 can also be coupled to a serving GPRS (General Packet Radio Service) support node (SGSN) 56. As known to those skilled in the art, the SGSN 56 is typically capable of performing functions similar to the MSC 46 for packet switched services. The SGSN 56, like the MSC 46, can be coupled to a data network, such as the Internet 50. The SGSN 56 can be directly coupled to the data network. In a more typical embodiment, however, the SGSN 56 is coupled to a packet-switched core network, such as a GPRS core network 58. The packet-switched core network is then coupled to another GTW 48, such as a gateway GPRS support node (GGSN) 60, and the GGSN 60 is coupled to the Internet 50. In addition to the GGSN 60, the packet-switched core network can also be coupled to a GTW 48. Also, the GGSN 60 can be coupled to a messaging center. In this regard, the GGSN 60 and the SGSN 56, like the MSC 46, may be capable of controlling the forwarding of messages, such as MMS messages. The GGSN 60 and SGSN 56 may also be capable of controlling the forwarding of messages for the mobile terminal 10 to and from the messaging center.

In addition, by coupling the SGSN 56 to the GPRS core network 58 and the GGSN 60, devices such as a computing system 52 and/or origin server 54 may be coupled to the mobile terminal 10 via the Internet 50, SGSN 56 and GGSN 60. In this regard, devices such as the computing system 52 and/or origin server 54 may communicate with the mobile terminal 10 across the SGSN 56, GPRS core network 58 and the GGSN 60. By directly or indirectly connecting mobile terminals 10 and the other devices (e.g., computing system 52, origin server 54, etc.) to the Internet 50, the mobile terminals 10 may communicate with the other devices and with one another, such as according to the Hypertext Transfer Protocol (HTTP) and/or the like, to thereby carry out various functions of the mobile terminals 10.

Although not every element of every possible mobile network is shown and described herein, it should be appreciated that the mobile terminal 10 may be coupled to one or more of any of a number of different networks through the BS 44. In this regard, the network(s) may be capable of supporting communication in accordance with any one or more of a number of first-generation (1G), second-generation (2G), 2.5G, third-generation (3G), 3.9G, fourth-generation (4G) mobile communication protocols or the like. For example, one or more of the network(s) can be capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. Further, for example, one or more of the network(s) can be capable of supporting communication in accordance with 3G wireless communication protocols such as a UMTS network employing WCDMA radio access technology. Some narrow-band analog mobile phone service (NAMPS), as well as total access communication system (TACS), network(s) may also benefit from embodiments of the present invention, as should dual or higher mode mobile stations (e.g., digital/analog or TDMA/CDMA/analog phones).

The mobile terminal 10 can further be coupled to one or more wireless access points (APs) 62. The APs 62 may comprise access points configured to communicate with the mobile terminal 10 in accordance with techniques such as, for example, radio frequency (RF), infrared (IrDA) or any of a number of different wireless networking techniques, including WLAN techniques such as IEEE 802.11 (e.g., 802.11a, 802.11b, 802.11g, 802.11n, etc.), world interoperability for microwave access (WiMAX) techniques such as IEEE 802.16, and/or wireless Personal Area Network (WPAN) techniques such as IEEE 802.15, BlueTooth (BT), ultra wideband (UWB) and/or the like. The APs 62 may be coupled to the Internet 50. Like with the MSC 46, the APs 62 can be directly coupled to the Internet 50. In one embodiment, however, the APs 62 are indirectly coupled to the Internet 50 via a GTW 48. Furthermore, in one embodiment, the BS 44 may be considered as another AP 62. As will be appreciated, by directly or indirectly connecting the mobile terminals 10 and the computing system 52, the origin server 54, and/or any of a number of other devices, to the Internet 50, the mobile terminals 10 can communicate with one another, the computing system, etc., to thereby carry out various functions of the mobile terminals 10, such as to transmit data, content or the like to, and/or receive content, data or the like from, the computing system 52. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention.

Although not shown in FIG. 2, in addition to or in lieu of coupling the mobile terminal 10 to computing systems 52 across the Internet 50, the mobile terminal 10 and computing system 52 may be coupled to one another and communicate in accordance with, for example, RF, BT, IrDA or any of a number of different wireline or wireless communication techniques, including LAN, WLAN, WiMAX, UWB techniques and/or the like. One or more of the computing systems 52 can additionally, or alternatively, include a removable memory capable of storing content, which can thereafter be transferred to the mobile terminal 10. Further, the mobile terminal 10 can be coupled to one or more electronic devices, such as printers, digital projectors and/or other multimedia capturing, producing and/or storing devices (e.g., other terminals). Like with the computing systems 52, the mobile terminal 10 may be configured to communicate with the portable electronic devices in accordance with techniques such as, for example, RF, BT, IrDA or any of a number of different wireline or wireless communication techniques, including universal serial bus (USB), LAN, WLAN, WiMAX, UWB techniques and/or the like.

In an exemplary embodiment, content or data may be communicated over the system of FIG. 2 between a mobile terminal, which may be similar to the mobile terminal 10 of FIG. 1, and a network device of the system of FIG. 2 in order to, for example, execute applications or establish communication (e.g., voice communications utilizing speech coding, image/video data captured by the camera module 37, etc.) between the mobile terminal 10 and other mobile terminals. As such, it should be understood that the system of FIG. 2 need not be employed for communication between mobile terminals or between a network device and the mobile terminal, but rather FIG. 2 is merely provided for purposes of example. Furthermore, it should be understood that embodiments of the present invention may be resident on a communication device such as the mobile terminal 10, and/or may be resident on other devices, absent any communication with the system of FIG. 2.

Figure 3:
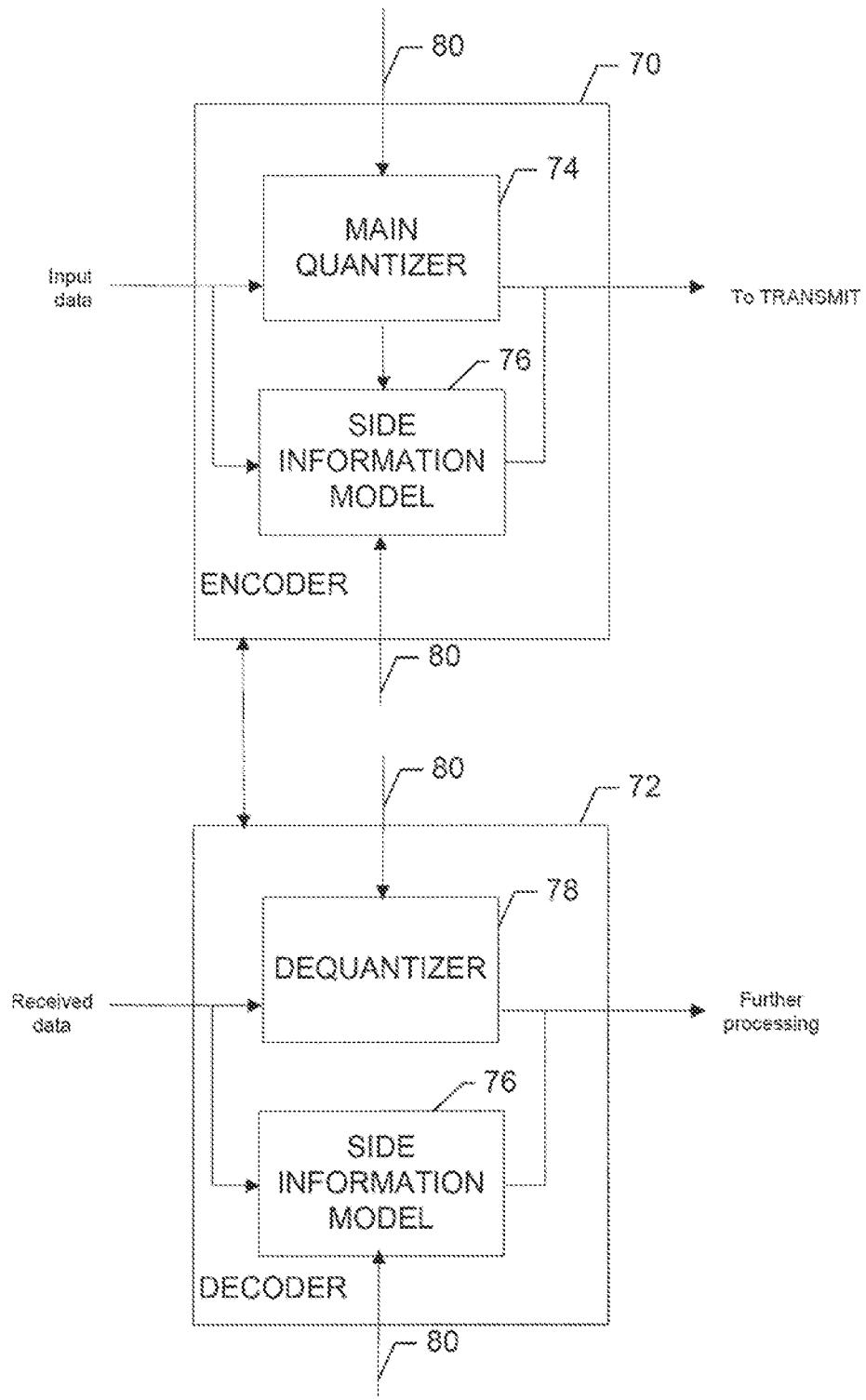
FIG. 3 illustrates a block diagram showing an encoder and a decoder according to an exemplary embodiment of the present invention.

An exemplary embodiment of the invention will now be described with reference to FIG. 3, in which certain elements of an apparatus for providing improved data compression in, for example, a low bit rate speech coding environment are displayed. The apparatus of FIG. 3 may be employed, for example, on the mobile terminal 10 of FIG. 1 and/or the computing system 52 or the origin server 54 of FIG. 2. However, it should be noted that the system of FIG. 3, may also be employed on a variety of other devices, both mobile and fixed, and therefore, the present invention should not be limited to application on devices such as the mobile terminal 10 of FIG. 1. It should also be noted, however, that while FIG. 3 illustrates one example of a configuration of an apparatus for providing improved data compression, numerous other configurations may also be used to implement the present invention. Furthermore, although an exemplary embodiment is described below primarily in the context of speech coding, embodiments of the present invention are not limited to use in the context of speech coding, but also apply more generally to data compression for other compression applications as well, such as video coding, image coding, audio coding, etc.

Referring now to FIG. 3, an apparatus for providing improved data compression for speech coding in a low bit rate speech coding application is provided. However, as indicated above, other types of coding may also be practiced in a similar manner to the description provided below. The apparatus includes an encoder 70 and a decoder 72 capable of communication with each other (although such communication is not required). The encoder 70 may be employed to encode data (e.g., speech data, audio data, video data, image data, etc.) and the decoder 72 may be employed to decode encoded data. The encoder 70 may be any means or device embodied in hardware, software or a combination of hardware and software that is capable of performing encoding operations as described below. In an exemplary embodiment, the encoder 70 is embodied in software as instructions that are stored on a memory of the mobile terminal 10 and executed by the controller 20. The decoder 72 may be any device or means embodied in either hardware, software, or a combination of hardware and software that is capable of performing decoding operations as described below. In an exemplary embodiment, the decoder 72 may be embodied in software as instructions that are stored on a memory of the mobile terminal 10 and executed by the controller 20. However, either or both of the encoder 70 and decoder 72 could also be embodied at a network device, such as, for example, the computing system 52 or the origin server 54 of FIG. 2, and/or at a different mobile terminal.

The encoder 70 may include a main quantizer 74 and a side information model 76. However, the side information model 76 could alternatively be separate from the encoder 70 (such as in the decoder 72 or elsewhere) or shared between the encoder 70 and the decoder 72. As yet another alternative, the encoder 70 may not include the side information model 76. The main quantizer 74 and the side information model 76 may each be any circuitry, means or device embodied in hardware, software or a combination of hardware and software that are configured to perform the corresponding functions of the main quantizer 74 and the side information model 76, respectively, as described below. In this regard, the main quantizer 74 may be configured to perform quantization operations on incoming or input data (e.g., speech data in this example). Quantization refers to a process of approximating a continuous set of values in the input data with a finite (preferably small) set of values. The input to the main quantizer 74 may be the original data, and the output of the main quantizer 74 may be a set of output values forming an approximation of the input, preferably with minimal loss or distortion. The main quantizer 74 may be trained, in accordance with embodiments of the present invention, in order to optimize, enhance or at least improve quantization accuracy for a portion of the input data. The portion of the input data for which the main quantizer 74 may be trained to provide optimal or improved quantization accuracy may be a high priority portion of the input data.

In the case of speech coding, the high priority portion of the input data may be the spectral envelope. However, the terms high priority and low priority, when used in the context of embodiments of the present invention, should be understood to be relative terms with respect to each other and do not represent high and low priorities in any absolute sense. As such, high priority data and low priority data can be predefined for content within any particular application. For example, background data may be low priority data in an image, rapidly changing features may be low priority data in video, and data in certain frequency bands may be lower priority in audio. However, one skilled in these respective arts may define high and low priority data as desired.

The side information model 76 may be trained simultaneously with the training of the main quantizer 74. In this regard, the side information model 76 and the main quantizer 74 may both be trained simultaneously while optimizing or improving the quantization accuracy for the high priority portion (e.g., the spectral envelope). As such, the side information model 76 may be trained as a consequence of the training of the main quantizer 74. The side information model 76 may then model side information comprising the low priority portion of the input data (e.g., the residual spectrum). As such, when the input data is processed by the encoder 70, encoding may only partially be performed on the input data. In this regard, only the high priority portion (e.g., the spectral envelope) may be encoded. The encoded high priority portion (e.g., the spectral envelope) and modeled low priority portion (e.g., the residual spectrum) may then be communicated to another device (e.g., via the system of FIG. 2).

Accordingly, as provided in this example, the encoder may receive input data in the form of speech data (although as indicated above, other forms of data may also be employed) and may compress the speech data such that the spectral envelope, which is high priority data, is processed by a quantizer trained to provide an improved or optimal efficiency with respect to quantizing only high priority data. Meanwhile low priority data may be modeled by a side model trained jointly with the training of the quantizer. In an exemplary embodiment, the output of the encoder therefore includes partially encoded data (the portion encoded corresponding to the high priority data) and a model of the low priority portion (e.g., the residual spectrum). However, there may not always be an explicit output related to the model of the residual spectrum. In this regard, for example, if all the bits are used for coding of the high priority data and there would be no bit indicative of modeling accuracy and thus, no output related to the model of the residual spectrum. In such a scenario, the decoder 72 may recover the residual spectrum based on the coded spectral envelope and the side information model 76 stored at the decoder 72.

The decoder 72 may receive encoded information and may decode the received information prior to further processing. In an exemplary embodiment, the decoder 72 may include a side information model (which could be the same as the side information model 76 used in the encoder or an identical version thereof) and a dequantizer 78. The decoder 72 may be configured to receive data communicated to the apparatus (e.g., the mobile terminal 10) that has been encoded in accordance with an embodiment of the present invention, such as by a device employing an encoder as described above. The dequantizer 78 may be any device or means embodied in either hardware, software, or a combination of hardware and software that is capable of dequantizing the quantized high priority portion (e.g., the spectral envelope). As such, at the decoder 72, the high priority portion (e.g., the spectral envelope) that was quantized by the main quantizer 74 may be recovered by the dequantizer 78 and the low priority portion (e.g., the residual spectrum) may be recovered by the side information model 76 using the information available for the high priority portion. Accordingly, with this approach, the low priority portion can be modeled as side information without using any bits for quantizing the low priority portion. As such, for example, if a low bit rate speech encoding operation is utilized for compression, e.g., in a high quality text-to-speech database, with twenty bits dedicated to quantization, all twenty of the bits may be utilized for quantizing the spectral envelope without devoting any bits to quantizing the residual spectrum and yet, at the decoder 72, the residual spectrum may be recovered from the modeled residual spectrum.

In an exemplary embodiment, one bit could be used for indication with respect to model sufficiency. In this regard, for example, one bit may be used to indicate whether the accuracy provided by the modeling described above is sufficient (e.g., based on modeling error for the residual spectrum). Accordingly, if accuracy is indicated as being insufficient, further details regarding the modeling error for the residual spectrum (or low priority data of any kind in other embodiments) may be provided and transmitted and/or stored in a location accessible for use in connection with practicing embodiments of the present invention.

As indicated in FIG. 3, the encoder 70 and decoder 72 may undergo training in order to, for example, optimize, enhance or improve performance of the main quantizer 74 (and dequantizer 78) with respect to high priority data as indicated at operation 80. Such training can also provide training the side information model 76 simultaneously. The training described above may be performed offline or online. As such, an apparatus (e.g., such as the mobile terminal 10) having the encoder 70 and/or decoder 72 may be pre-trained and, when received by a user, may include a trained encoder 70 and/or decoder 72. Moreover, since the encoder 70 and/or decoder 72 may each be embodied in software, in at least one embodiment, the encoder 70 and/or decoder 72 may each be controlled by or otherwise embodied as a processing element such as the controller 20 of the mobile terminal 10 (or a processor of a server, computer or other device). Processing elements such as those described herein may be embodied in many ways. For example, the processing element may be embodied as a processor, a coprocessor, a controller or various other processing means or devices including integrated circuits such as, for example, an ASIC (application specific integrated circuit).

An exemplary embodiment of the present invention will now be described in the context of vector quantization and, more specifically, in the context of multistage vector quantization (MSVQ). In this regard, some initial information will initially be provided as a background related to MSVQ. However, embodiments of the present invention may also be practiced in other quantization contexts as well and MSVQ is merely one type of quantization that is provided herein by way of example and not of limitation. In alternative embodiments of the invention, a typical characteristic of the training procedure may be that the encoding criterion and the centroid calculation and/or model training are decoupled. In this regard, the encoding step may be done only partially, e.g., only for the high-priority data, but the centroids and/or other models may be computed also for the low-priority data.

An MSVQ quantizes vectors in two or more additive stages. The objective is to find a vector combination, in other words a sum of the selected vectors at different stages, that minimizes the resulting distortion. The quantized vector can be defined as:

$$\hat{x} = \sum_{j=1}^{S} y_{l_j}^{(j)},$$

where $y_l^{(j)}$ denotes the lth reproduction vector from the jth stage and S is the number of stages. $l_j$ is the selected vector in the jth stage. Alternatively, the quantized vector in multistage quantization can be expressed as:

$$\hat{x} = \sum_{j=1}^{S} T_{l_j}^{(j)} c_j = Tc,$$

where vector $c_j$ is the codebook (e.g., stacked codebook) of jth stage $$c_j = \left[ y_1^{(j)T} \ y_2^{(j)T} \ \ldots \ y_{N_j}^{(j)T} \right]^T,$$

and the selection matrix for the jth stage, $T_l^{(j)}$, is a sparse Toeplitz matrix (p by $pN_j$, $N_j$ being the number of codevectors at jth stage) that satisfies $$T_l^{(j)} c_j = y_l^{(j)}.$$

The column vector c is the combined stacked codebook $$c = [c_1^T c_2^T \ldots c_S^T]^T,$$

and the matrix T is the multistage selection matrix $$T = [T_{l_1}^{(1)} T_{l_2}^{(2)} \ldots T_{l_S}^{(S)}].$$

With this notation, the quantization process can be viewed as the process of constructing the selection matrix T.

Implementation of encoding and decoding in an exemplary use case is provided below. In this regard, for example, let x denote a complete spectral vector to be quantized. The complete spectral vector may include the spectral envelope part a and the residual spectrum part b, combined together as $x = [a^T b^T]^T$. In our implementation, a may be assumed to have been obtained through linear prediction and represented using line spectral frequencies (LSF). The vector b may have been obtained by modeling the spectral details (e.g., low priority data) by transforming the residual amplitude spectrum into fixed-dimension mel cepstrum domain.

Using conventional techniques, we could jointly quantize a and b in the vector x using e.g. the weighted squared error distortion measure:

$$d(x, \hat{x}) = (x-\hat{x})^T W(x-\hat{x}),$$

Here, we assume that the matrix W is diagonal, with weights selected according to the subjective importance of the corresponding vector components. As a new addition related to an embodiment of the present invention, a new matrix Z may be included into the distortion measure to obtain the new measure:

$$d_p(x, \hat{x}) = (x-\hat{x})^T (ZW)(x-\hat{x}),$$

that can be used in the partial encoding. The matrix Z is a diagonal matrix whose diagonal elements that correspond to vector a are set to 1 and others to 0. As such, the matrix Z may be considered a selector for partial encoding. In other words, matrix Z may be a tool used to enable the quantization to focus on the spectral envelope by selecting the high priority data (e.g., data corresponding to the spectral envelope). At the decoder, the whole vector, including the spectral envelope part and the residual spectrum part, is recovered. In an exemplary embodiment, the residual spectrum part can be directly stored in the codebook. In another embodiment, the residual spectrum part can be recovered using the information available from the spectral envelope part and a separate side information model. MSVQ may be used together with an M-L tree search algorithm.

As indicated above, if the resulting quality is not considered sufficient, one bit per vector may be included for indicating the quality of the modeled vector b. If the bit indicates that the accuracy of the particular vector is not sufficient, separate refinement information may be included for the vector. The quantizer for the refinement information can be used and trained in a conventional manner.

Quantizer training will now be described in accordance with an exemplary embodiment of the present invention. In an exemplary embodiment, the algorithm used for training the quantizer may be modified from that of a conventional quantizer in order to achieve the benefits described herein. In particular, the partial encoding must be taken into the account (e.g., by providing the selector matrix Z). A summary of a conventional training scheme and the necessary modifications according to one example is described below. First, notations defined earlier in this section are used. In addition, $W_n$ is a (diagonal) weighting matrix for the nth training vector. The weighted squared distortion may be rewritten as:

$$d_r = d_0 - 2c^T Y + c^T Q c,$$

where $$d_0 = \sum_n x_n^T W_n x_n, \quad Y = \sum_n T_n^T W_n x_n,$$

and $$Q = \sum_n T_n^T W_n x_n.$$

Furthermore, $S_j$ is a shifting matrix satisfying the condition $c = \bar{c}_j + S_j c_j$, and vector $\bar{c}_j$ is the stacked codebook c with the vector components corresponding to jth stage codebook replaced with zeros.

Embodiments of the present invention can utilize a simultaneous joint design algorithm that may be initialized with sequentially designed random codebooks. Table 1 illustrates an example of the simultaneous joint design algorithm. Of note, in Table 1, the distortion $d_p$ mentioned at step 2 below is computed using the new matrix Z described above.

TABLE 1

1. Initialize.
   Set q = 1. Create an S stage random codebook.
2. Partition.
   Set all elements of Y and Q to zero. Then, for each vector in the training sequence, determine the codebook indices which minimize the distortion $d_p$. Compute both $T_n^T W_n T_n$ and $T_n^T W_n x_n$ and update the running sum Q, Y and $d_q$.
3. Compute new codebooks.
   For j = 1 to S compute $c_j = Q_{jj}^{-1} Y_j$, where $Q_{jj} = S_j^T Q S_j$ and $Y_j = S_j^T (Y - Q\bar{c}_j)$.
4. Convergence of c.
   Repeat Operation 3 until convergence.
5. Reorder.
   Modify the order of the codebooks such that the energy in $c_j$ after subtracting the codebook mean is less than the corresponding energy in $c_i$ for all j > i. Ensure that the sum of all codevectors of each codebook (except the first codebook) is zero.
6. Convergence test.
   If $| d_{q-1} - d_q | / d_q > \epsilon_d$, set q = q + 1 and go to Operation 2. $\epsilon_d$ being a threshold for determining convergence. Distances used to measure convergence may be measured using the partial approach above (e.g., with application of the Z matrix) or via conventional approaches.
7. Terminate.

After initialization at operation 1, data comprising a training set may be quantized using the codebooks, and the running sums Q, Y and $d_q$ may be updated correspondingly. In theory, it is assumed that the quantization is performed using a full search (e.g., all combinations in the codebook are searched). However, it has been experimentally found that good performance can be achieved by employing the M-L tree search with a moderate value of M. Operations 3 and 4 may define an inner loop which minimizes the total distortion and thus optimizes the stacked codebook using the partitioning performed at operation 2. Finally, the codebooks may be reordered to enhance the performance of the M-L tree search before continuing with a new partitioning. Of note, the exemplary implementation provided above produces a straightforward side information model that can be stored inside the codebook(s) of the main quantizer. In other words, for example, the resulting codebook(s) can be stored in such a way that the resulting codebook(s) include joint vectors x that include both the high-priority part to be encoded, a, and the low-priority side information part b.

Figure 4:
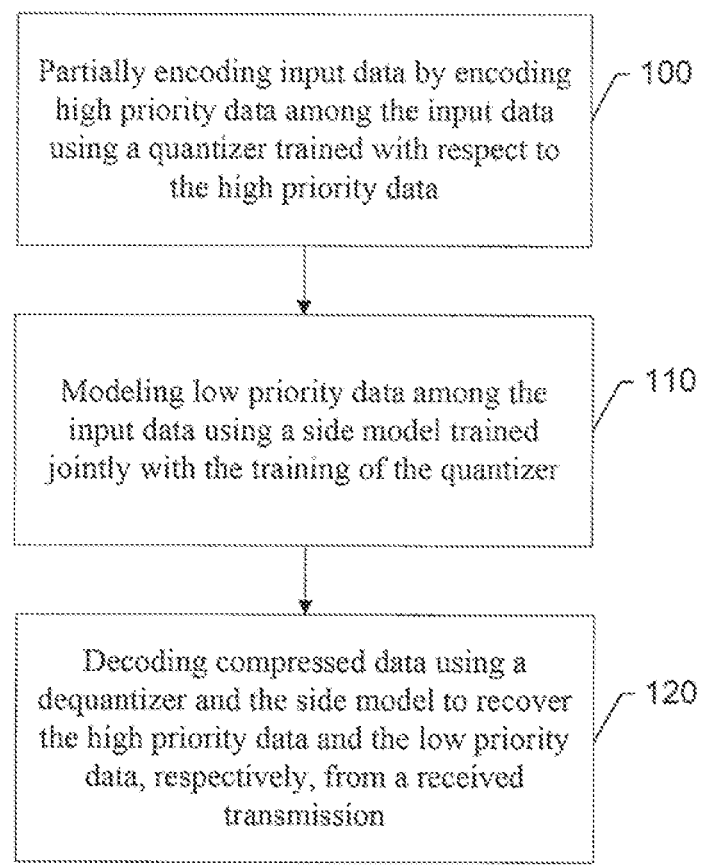
FIG. 4 is a block diagram according to an exemplary method of improving data compression according to an exemplary embodiment of the present invention.
Figure 5:
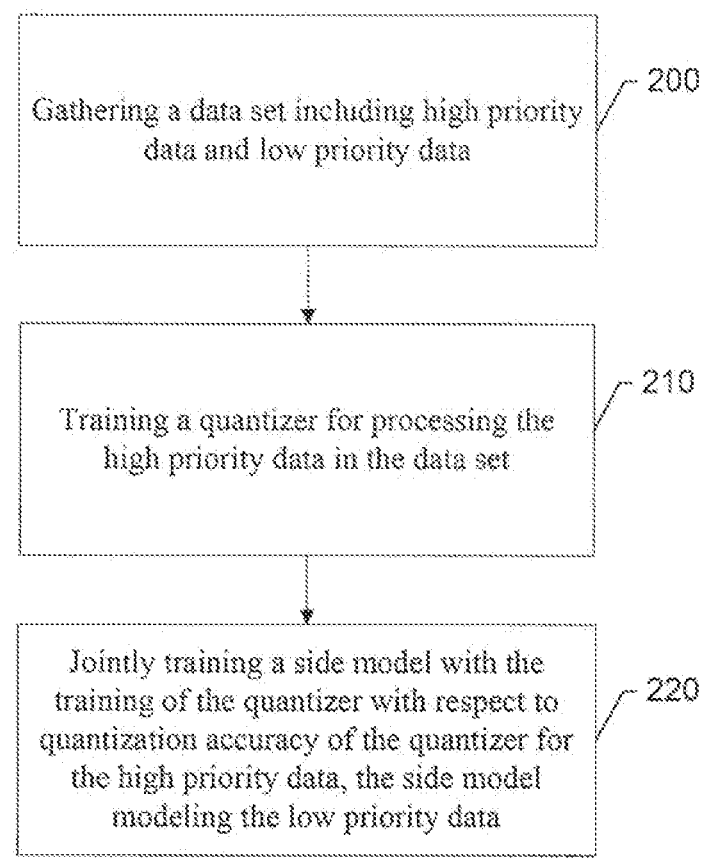
FIG. 5 illustrates a method of training a quantizer and a side model in accordance with an embodiment of the present invention.

FIGS. 4 and 5 are flowcharts of methods and program products according to exemplary embodiments of the invention. It will be understood that each block or step of the flowcharts, and combinations of blocks in the flowcharts, can be implemented by various means, such as hardware, firmware, and/or software including one or more computer program instructions. For example, one or more of the procedures described above may be embodied by computer program instructions. In this regard, the computer program instructions which embody the procedures described above may be stored by a memory device of the mobile terminal and executed by a built-in processor in the mobile terminal. As will be appreciated, any such computer program instructions may be loaded onto a computer or other programmable apparatus (i.e., hardware) to produce a machine, such that the instructions which execute on the computer or other programmable apparatus create means for implementing the functions specified in the flowcharts block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowcharts block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowcharts block(s) or step(s).

Accordingly, blocks or steps of the flowcharts support combinations of means for performing the specified functions, combinations of steps for performing the specified functions and program instruction means for performing the specified functions. It will also be understood that one or more blocks or steps of the flowcharts, and combinations of blocks or steps in the flowcharts, can be implemented by special purpose hardware-based computer systems which perform the specified functions or steps, or combinations of special purpose hardware and computer instructions.

In this regard, one embodiment of a method for providing improved data compression, as illustrated in FIG. 4, may provide that input data may be compressed without using any bits for quantization of the low priority data. The method may include partially encoding input data by encoding high priority data among the input data using a quantizer trained with respect to the high priority data at operation 100. A selector matrix may be utilized to enable encoding only the input data that corresponds to the high priority data. Low priority data may be modeled, at operation 110, using a side model trained jointly with the training of the quantizer. In an exemplary embodiment, the method may further include decoding compressed data using a dequantizer and the side model to recover the high priority data and the low priority data, respectively, from a received transmission at an optional operation 120. In another exemplary embodiment, compression may include quantizing the high priority data using the quantizer that is further trained to optimize or enhance quantization accuracy for the high priority data while simultaneously training the side model.

In an optional embodiment, the method may further include providing an indicator bit indicative of a sufficiency of the accuracy of the modeling of the low priority data. In this regard, for example, modeling error information for improving modeling accuracy may be provided in response to the indicator bit indicating insufficient modeling accuracy.

FIG. 5 illustrates a method of training the quantizer and the side model in accordance with an embodiment of the present invention. As indicated in FIG. 5, the method may include gathering a data set including high priority data and low priority data jointly at operation 200. At operation 210, a quantizer may be trained for processing the high priority data in a data set. The side model may then be jointly trained with the training of the quantizer with respect to quantization accuracy of the quantizer for the high priority data at operation 220. In an exemplary embodiment, operations 210 and 220 may be handled simultaneously and/or with many iterations for the training. The side model may be configured for modeling the low priority data. In an exemplary embodiment, the training of the quantizer and the joint training of the side model may include simultaneously training the quantizer and the side model offline.

Embodiments of the present invention may provide for a reduction in the bit rate required to achieve a given quality level (or better quality for a given bit rate), without a significant increase in computational load. Furthermore, only moderate increases in memory consumption may be required (e.g., for storage of side information data).

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method to be performed on a decoder of a mobile device, the method comprising:
decoding, by a dequantizer of the decoder, compressed data to recover high priority data from a received signal, the high priority data being associated with spectral envelope data of spectral information of input data that was previously encoded as the received signal before the received signal was received, the input data corresponding to at least one of speech data, video data, image data, and audio data; and
recovering, by a side model of the decoder, low priority data from the received signal, the low priority data being associated with residual spectrum data comprising remaining parts of the spectral information other than the spectral envelope data of the input data, the side model being concurrently trained with the training of a quantizer used to encode the input signal, the quantizer trained with respect to the high priority data.

2. The method of claim 1, wherein the low priority data is not quantized and not encoded.

3. The method of claim 1, wherein the received signal comprises partially encoded input data, the input data being partially encoded by an encoder encoding high priority data among the input data using the quantizer.

4. The method of claim 1, wherein the received signal includes an indicator bit indicative of a sufficiency of the accuracy of the modeling of the low priority data and modeling error information for improving modeling accuracy when the indicator bit indicates insufficient modeling accuracy.

5. An apparatus comprising:
at least one processor; and
a decoder of a mobile device communicatively coupled to the at least one processor and comprising:
a dequantizer configured to decode compressed data to recover high priority data from a received signal, the high priority data being associated with spectral envelope data of spectral information of input data that was previously encoded as the received signal before the received signal was received, the input data corresponding to at least one of speech data, video data, image data, and audio data; and
a side model configured to recover low priority data from the received signal, the low priority data being associated with residual spectrum data comprising remaining parts of the spectral information other than the spectral envelope data of the input data, the side model being concurrently trained with the training of a quantizer used to encode the input signal, the quantizer trained with respect to the high priority data.

6. The apparatus of claim 5, wherein the low priority data is not quantized and not encoded.

7. The apparatus of claim 5, wherein the received signal comprises partially encoded input data, the input data being partially encoded by an encoder encoding high priority data among the input data using the quantizer.

8. The apparatus of claim 5, wherein the received signal includes an indicator bit indicative of a sufficiency of the accuracy of the modeling of the low priority data and modeling error information for improving modeling accuracy when the indicator bit indicates insufficient modeling accuracy.

9. A computer program product comprising at least one non-transitory computer-readable storage medium having computer-readable program code portions stored therein to be executed on a mobile device, the computer-readable program code portions comprising:
   a first executable portion for decoding compressed data using a dequantizer module to recover high priority data from a received signal, the high priority data being associated with spectral envelope data of spectral information of input data that was previously encoded as the received signal before the received signal was received, the input data corresponding to at least one of speech data, video data, image data, and audio data; and
   a second executable portion for recovering low priority data from the received signal using a side model module, the low priority data being associated with residual spectrum data comprising remaining parts of the spectral information other than the spectral envelope data of the input data, the side model module being concurrently trained with the training of a quantizer module used to encode the input signal, the quantizer module trained with respect to the high priority data.

10. The computer program product of claim 9, wherein the low priority data is not quantized and not encoded.

11. The computer program product of claim 9, wherein the received signal comprises partially encoded input data, the input data being partially encoded by an encoder encoding high priority data among the input data using the quantizer module.

12. The computer program product of claim 9, wherein the received signal includes an indicator bit indicative of a sufficiency of the accuracy of the modeling of the low priority data and modeling error information for improving modeling accuracy when the indicator bit indicates insufficient modeling accuracy.

* * * * *